United States Patent [19]

Schofield et al.

[11] Patent Number: 4,937,945
[45] Date of Patent: Jul. 3, 1990

[54] MAGNETIC COMPASS WITH OPTICAL ENCODER

[75] Inventors: Kenneth Schofield; Desmond J. O'Farrell, both of Holland; Kenneth L. Schierbeek, Zeeland, all of Mich.

[73] Assignee: Donnelly Corporation, Holland, Mich.

[21] Appl. No.: 267,972

[22] Filed: Nov. 7, 1988

Related U.S. Application Data

[63] Continuation-in-part of Ser. No. 117,220, Nov. 4, 1987, Pat. No. 4,862,594.

[51] Int. Cl.[5] ............................................. G01C 17/26
[52] U.S. Cl. ..................................... 33/356; 33/363 K
[58] Field of Search ......... 33/355 R, 355 D, 356–364, 33/352; 250/231 SE

[56] References Cited

U.S. PATENT DOCUMENTS

| | | | |
|---|---|---|---|
| 2,518,258 | 11/1948 | Schulte | 33/355 R |
| 3,746,842 | 7/1973 | Fowler | 33/363 K |
| 3,950,859 | 4/1976 | Kramer | 33/363 K |
| 4,047,168 | 9/1977 | Fowler | 33/363 R |
| 4,146,970 | 4/1979 | Edwards | 33/363 K |
| 4,402,142 | 9/1983 | Dinsmore | 33/363 R |
| 4,414,754 | 11/1983 | Lapeyre | 33/363 K |
| 4,862,594 | 9/1989 | Schierbeek et al. | 33/356 |

Primary Examiner—L. T. Hix
Assistant Examiner—David M. Gray
Attorney, Agent, or Firm—Reising, Ethington, Barnard, Perry & Milton

[57] ABSTRACT

A magnetic compass is disclosed which is especially adapted for use in automotive vehicles and which is provided with an optical angular position encoder. The housing comprises a cylindrical cup and a hollow cylindrical rim; a compass rotor is disposed in the housing with the magnet in the cup and an encoder disk in the rim. The hollow rim has a base plate defining a vehicle orientation axis and a cover plate. The rotor is provided with a reference position aperture and a plurality of displacement angle apertures disposed in a single circumferential track. The transducer comprises optical transmitters and receivers mounted opposite each other on the plates for detecting the apertures in the encoder disk. Support arms for the compensation coils and the search coil are disposed on the cup opposite the magnet in a predetermined angular location relative to the orientation axis. The housing including support arms, optical apertures and retaining means for the transmitters and receivers are molded as a unitary body. The rotor is a molded body including the magnet holder and encoder disk with provision for magnetizing the embedded magnet.

10 Claims, 3 Drawing Sheets

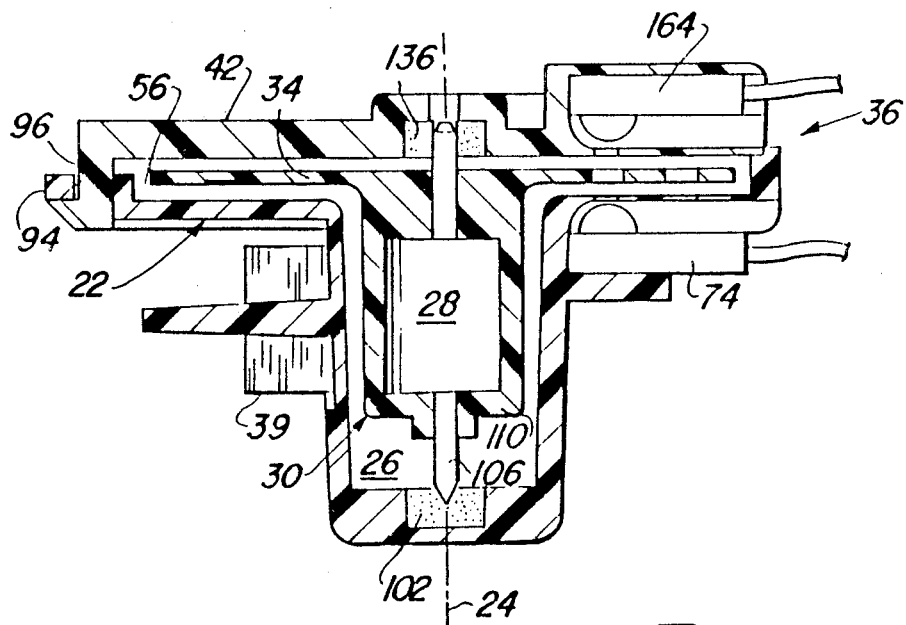
Fig-4
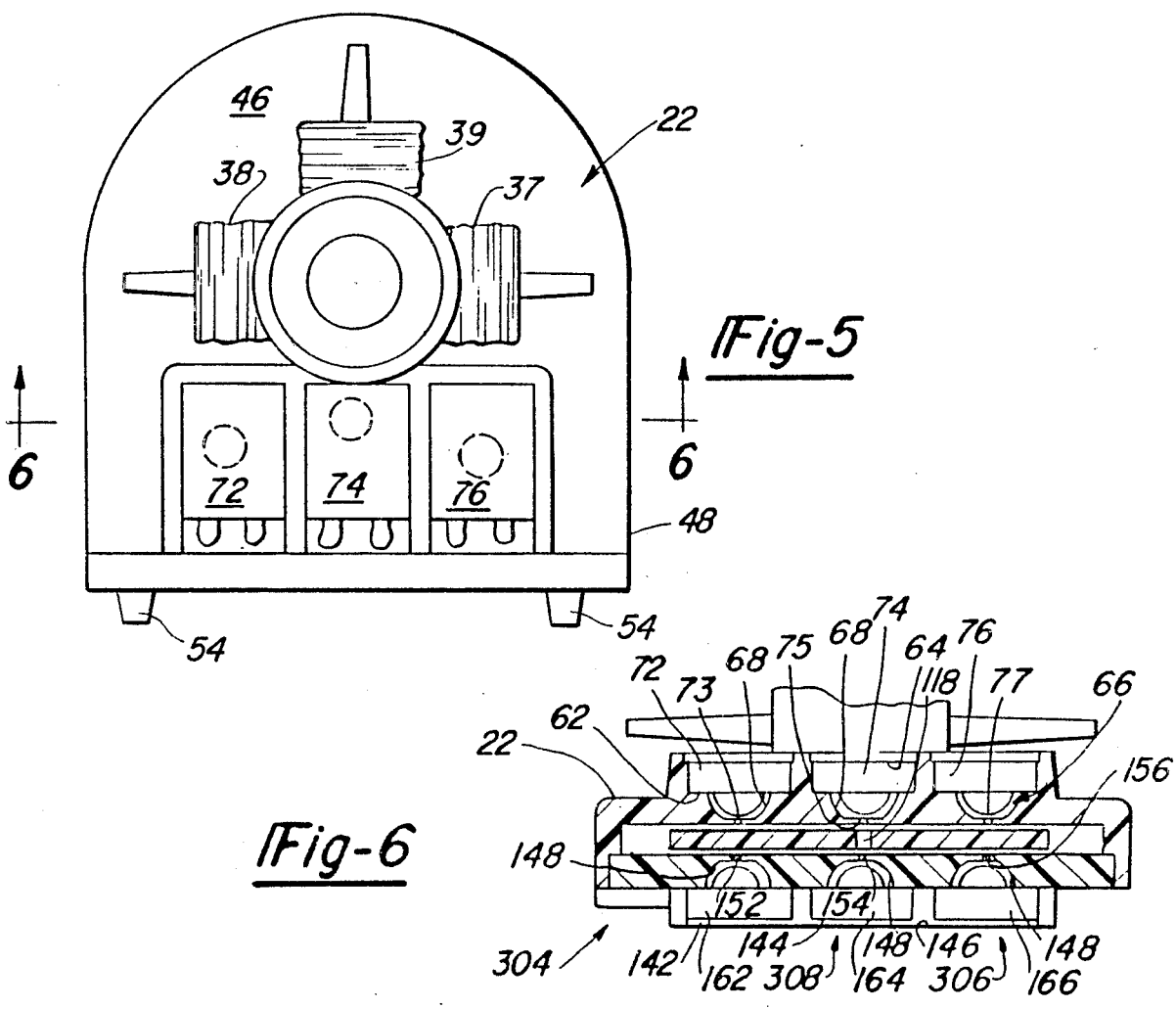
Fig-5
Fig-6

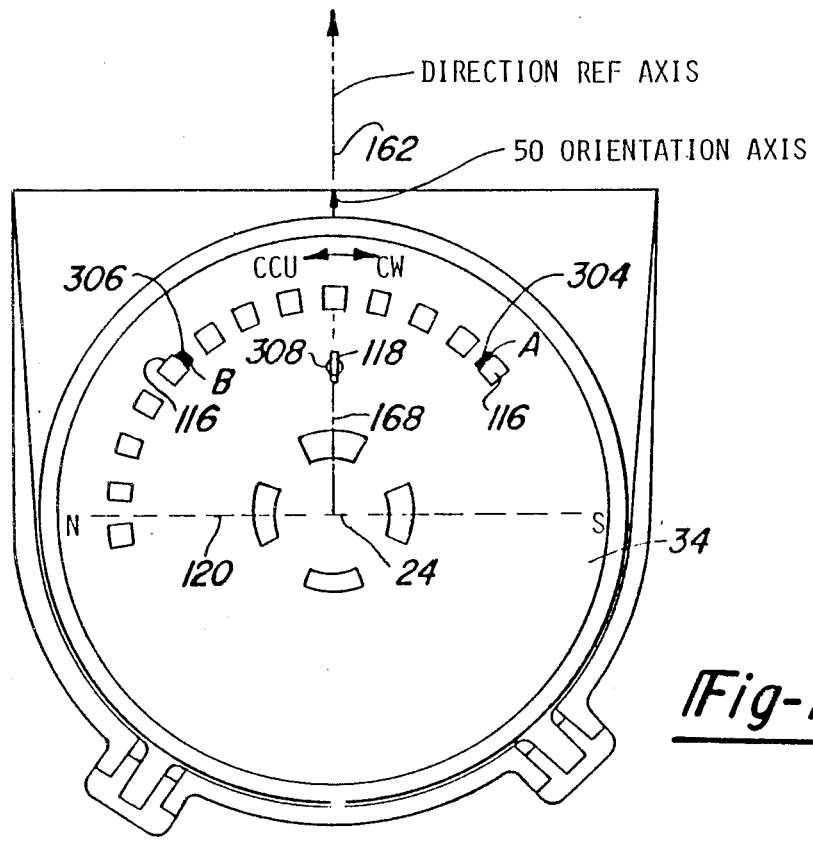
*Fig-7*
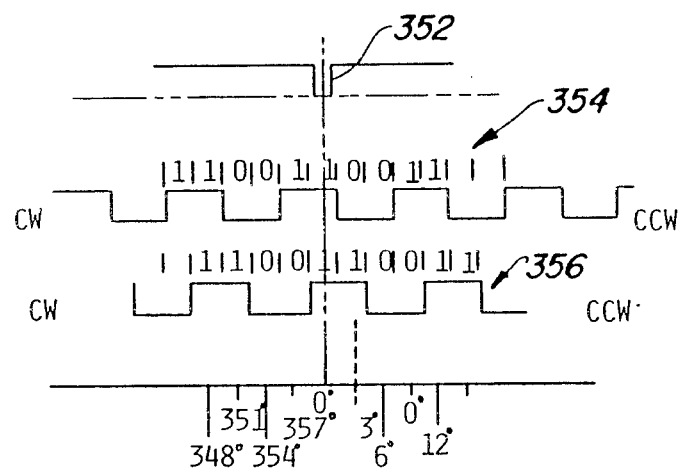
*Fig-8*
| COUNT | DEGREES | CCW | CW | DEGREES | COUNT |
|---|---|---|---|---|---|
| 120 | 268½-271½ | 1 1 | 1 1 | 268½-271½ | 0 |
| 119 | 265½-268½ | 0 1 | 1 0 | 271½-274½ | 1 |
| 118 | 262½-265½ | 0 0 | 0 0 | 274½-277½ | 2 |
| 117 | 259½-262½ | 1 0 | 0 1 | 277½-280½ | 3 |
| . | . | 1 1 | 1 1 | . | . |
*Fig-9*

MAGNETIC COMPASS WITH OPTICAL ENCODER

This is a continuation-in-part application of U.S. Serial No. 117,220 filed Nov. 4, 1987, now U.S. Pat. No. 4,862,594.

FIELD OF THE INVENTION

This invention is related to magnetic compasses; more particularly, it relates to a magnetic compass with an optical position encoder for producing electronic direction data signals.

BACKGROUND OF THE INVENTION

Magnetic compasses especially adapted for use in automotive vehicles are commonly used as an aid in orientation for the purpose of highway navigation. Typically, such compasses are of the type which utilize a compass card which carries the compass magnet as well as the direction indicator within the view of the vehicle driver. Compensation of the compass for magnetic field deviation due to the local effect of magnetic materials and for magnetic variation due to geographical location has long been a problem in obtaining reliable direction indication with such compasses. Improved compensation and also improved direction display for the driver can be achieved by locating the magnetic field sensor of the compass and the compass display at separate locations in the vehicle. For this purpose, it is desirable to utilize an angular position encoder with the compass for producing electronic direction data signals and applying such signals to a remote display for presentation of the direction information to the driver. Such an automotive vehicle compass is disclosed in the Dinsmore patent 4,402,142 granted September 6, 1983. The compass of this patent is provided with a Hall effect angular position encoder for producing electronic direction data signals.

Magnetic compasses are well known which utilize optical devices for angular position encoders for producing electronic direction data signals; however, such compasses known in the prior art are not well adapted for use in automotive vehicles because of complexity, size and cost. A compass for automotive vehicles must be adapted for mass production at low cost and yet it must provide an accuracy consistent with the need for navigation of an automotive vehicle. The compass must be of rugged construction and reliable in operation. It is desirable to have the compass magnetic field sensor and the angular position encoder adapted for mounting in a variety of locations in the vehicle so as to facilitate space utilization and to minimize the adverse effects of magnetic field deviation. Preferably, it should be adapted to produce electronic direction data signals for application to a remote display. The compass, i.e. the combined magnetic field sensor and angular position encoder, should be of small size. It may be desired to mount the compass on a circuit board containing the electronic circuit required for processing the data signals and for driving the remote display device to show the heading of the vehicle. The Schulte patent 2,518,258 granted August 8, 1950 discloses a magnetic compass with photoelectric means for indicating deviations from a set course. In this compass, a semi-spherical compass card is disposed in a housing and supported by a pivot pin on a central post. The post supports a light source and a pair of photocells are mounted on the compass housing at diametrically opposite locations. The compass card is provided with a window of such angular extent that it blocks light from the light source from impinging upon either of the photocells when the heading coincides with the set course. However, when the heading deviates from the set course the window allows the light to impinge upon one photocell or the other, depending upon the direction of deviation.

The Fowler patent 3,746,842 granted July 17, 1973 discloses a magnetic compass with provides a digital signal representing an indication of direction. A rotor, in the form of a circular disk, is supported in a frame on a pivot pin which also carries a compass bar magnet. The circular card bears a coded mask and a light source on one side of the mask and a photoelectric detector on the other side generate a digitally coded signal corresponding to the position of the rotor with respect to the frame. The coded mask on the card comprises a plurality of annular tracks of different radius. The tracks constitute a code representing angular position with each track comprising alternate light transparent and opaque sectors. The tracks are coded in a binary code such as the Gray code. In this each individual track contributes one bit of a binary number and hence the degree of resolution of angular position is determined by the number of tracks. A separate photoelectric detector is provided for each track and the set of detectors generate a digital electronic signal corresponding to angular position. Means are provided for converting the electronic signal to a decimal course display. Remote reading magnetic compasses utilizing similar optical position encoders are described in the Fowler patent 4,047,168 granted September 6, 1977 and the Lapeyre patent 4,414,754 granted November 15, 1983.

The Edwards patent 4,146,970 granted April 3, 1979 describes a remote indicating magnetic compass for use in an automotive vehicle. According to this patent, the system comprises a compass which may be mounted at a selected location on the vehicle and a bearing display device which may be mounted on the instrument panel of the vehicle. The compass comprises an encoding wheel which is rotatably mounted within a housing on a pivot pin and which carries a compass magnet. The encoding wheel is provided with one or more code tracks each of which comprises a segment of light reflective surface and a segment of non-reflective surface. Four light source-sensor pairs are spaced circumferentially around the wheel with the light paths between the source and sensor of each pair impinging upon the surface of the code track on the wheel. The light source-sensor pairs provide a digital signal which represents the angular position of the compass wheel. The degree of resolution for determining the angular position is dependent upon the number of code tracks on the wheel.

The Kramer patent 3,950,859 granted Apr. 20, 1976 discloses a magnetic compass with a digitally coded disk for determining angular position. The coded disk is generally transparent but includes a sequence of opaque areas in a circumferential track. There are a plurality of tracks and each track produces a sequence of binary digits which form a bit in a binary coded decimal character. The coded disk is disposed between a pair of plates which are provided with aligned apertures for each of the tracks on the disk. For each track, a light emitting diode is positioned behind one plate and a photo transistor is positioned behind the other plate for generating the digital signal corresponding to that track.

Although magnetic compasses are well known which utilize angular position encoders for producing electronic direction signals for remote display, such compasses as are known in the prior art are not well adapted for use in automotive vehicles and small boats because of complexity, size and cost. A compass for such vehicles must be adapted for mass production at low cost and yet it must provide an accuracy consistent with the need for the vehicle navigation. The compass must be of rugged construction and reliable in operation and it must lend itself to mounting in a variety of locations in the vehicle. The compass, i.e. the combined magnetic field sensor and the angular position encoder, should be of very small size.

A general object of this invention is to provide an improved magnetic compass with an optical position encoder which overcomes certain disadvantages of the prior art.

SUMMARY OF THE INVENTION

In accordance with this invention, there is provided an improved magnetic compass with a compass magnet and a position encoder in a subassembly which is extremely compact and economical to manufacture. Further, it provides good accuracy and reliability in operation. The encoder is preferably an optical encoder.

In accordance with the invention, a compass rotor and housing therefor are provided in miniature size and is admirably suited for use in automotive vehicles. The compass rotor is provided with a magnet and an integrally combined encoder disk which is disposed axially of the magnet; both the magnet and the disk have a minimum diameter consistent with the desired accuracy of the compass reading.

Further, in accordance with the invention, the housing is provided with a configuration which conforms to the rotor configuration to minimize the external dimensions. This provides a housing or support body which comprises a cylindrical cup and a cylindrical rim at the open end of the cup. The compass rotor is disposed in the body with the magnet in the cup and the encoder disk in the rim and with pivot pins supported by the bottom of the cup and the rim.

Further, according to the invention, a transducer is provided for producing heading data signals in accordance with the movement of the rotor relative to the support body. A reference position sensor having a first optical transmitter and a first optical receiver are disposed opposite each other on opposite faces of the rim with an optical path therebetween through optical apertures in the plates which form the hollow rim for detecting the alignment therewith of a reference aperture in the encoder disk. Further, a pair of displacement sensors are provided in a similar disposition when opposite faces of the rim with an optical path therebetween through the plates of the rim for sensing a circumferential code track on the encoder disk comprising a plurality of apertures. This arrangement permits a circumferential disposition of transmitters and receivers on opposite faces of the rim of the housing in the space radially outwardly of the cup.

Further, in accordance with the invention, the compensation coils and search coils may be disposed around the cup in close proximity to the magnet and thus achieve a maximum of magnetic influence on the compass magnet with minimum field strength and size of the coils.

Further, in accordance with this invention, improved reproducibility with high accuracy is provided for a compass in which accuracy depends upon accurate angular location of the sensor elements with reference to the orientation axis of the compass support body and accurate angular relationship between the polar axis of the compass magnet and a reference position aperture on the encoder disk. This is achieved by a rotor housing which has retaining means for the sensors and the optical apertures associated therewith formed as a unitary body of molded polymeric material. This is further achieved by a rotor which includes a magnet holder of molded polymeric material with the compass magnet and pivot pins for the rotor embedded in the magnet holder. The encoder disk is unitary with the magnet holder and axially displaced from the magnet. The compass magnet is magnetized with a polar axis having a predetermined angular position relative to a reference line through a reference aperture in the encoder disk and the rotation axis of the rotor.

Further, in accordance with the invention, a magnet holder defines a pair of diametrically opposite, radially opening, recesses having a predetermined angular location relative to a reference line extending radially through the reference aperture and the rotation axis. This permits the compass magnet to be magnetized with a polar axis having a predetermined angular relation to said reference line by placing elements of a magnetizer in the recesses in close proximity with the magnet after it is embedded in the holder.

A complete understanding of this invention may be obtained from the detailed description that follows taken with the accompanying drawings.

DESCRIPTION OF THE DRAWINGS

FIG. 4 is a cross-sectional view of the compass taken generally on lines 4—4 of FIG. 3;

FIGURE 5 is a bottom plan view of the compass body;

FIG. 6 is a view taken on lines 6—6 of FIG. 5;

FIG. 7 shows a plan view of the optical encoder disk;

FIG. 8 is a diagram showing the relationship of the encoder signals; and

FIG. 9 is a table showing the relationship of certain decoder binary signals and angular displacement values.

BEST MODE FOR CARRYING OUT THE INVENTION

Figure 1:
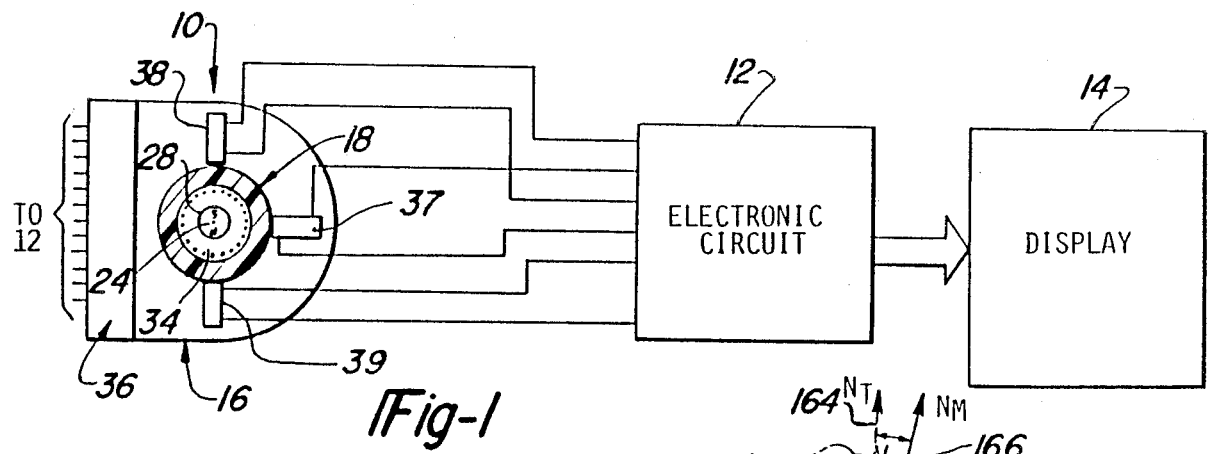
FIG. 1 is a block diagram representation showing the compass system of this invention.

Referring now to the drawings, there is shown an illustrative embodiment of the invention in a magnetic compass system with an optical position encoder. The compass is especially adapted for use in an automotive vehicle. It will be appreciated as the description proceeds that the invention is useful in other applications and may be realized in different embodiments.

General Description of the Compass System

In general, the compass of this invention has a rotor which carries a magnet which seeks to orient its polar axis with the local magnetic field which, for the present purpose, may be considered to have the same orientation as the earth's magnetic field and hence has the direction of magnetic north. The compass is provided with an angular position encoder which provides a direction data signal representing the angular displacement from some reference position or direction. The compass rotor is initially oriented in a reference direction and then the angular displacement of the rotor, either clockwise or counterclockwise, is measured by the encoder until it settles in alignment with the local magnetic field. The net displacement is taken as the heading angle indicated by the compass relative to the reference direction. This method of finding the vehicle heading by measurement of the relative displacement rather than obtaining a measurement in an absolute sense greatly simplifies the structure and the electronics of a vehicle compass.

FIG. 1 shows a compass system embodying the compass of this invention with the compass 10 shown in a bottom plan view partially in section. In general, the system comprises the compass 10, an electronic circuit 12 and a remote compass display 14. The compass 10, in general, comprises a support body 16 including a cylindrical cup 18 and a base 22. The cylindrical cup 18 has a longitudinally extending axis 24 and defines a chamber around the axis. A compass magnet 28 of cylindrical shape is radially polarized and is rotatable about the longitudinal axis 24. The compass magnet 28 is freely rotatable relative to the body 16 and, in the manner of a compass needle, it aligns itself with the local magnetic field. The angular position of the compass magnet is detected by an optical position encoder which comprises an encoder disk 34 which is mounted for rotation with the compass magnet 28. The encoder also comprises an optical transducer 36 coacting with the encoder disk 34. In order to compensate the local magnetic field for the effects of deviation a set of compensation coils 37 and 39 are provided. A search coil 38 is provided for a purpose which will be described subsequently. The optical transducer 36 coacting with the encoder disk 34 develops a direction data signal which is electrically coupled with the electronic circuit 12 which decodes the signals and develops a heading signal corresponding to the heading of the vehicle. The heading signal is applied by the electronic circuit 12 to the compass display 14 for visual presentation of the vehicle heading. The read-out of the display 14 may be expressed in degrees or it may be expressed in abbreviated notation for the compass points such as N, E, S and W for the cardinal points and NE, SE, SW and NW for the intercardinal or secondary compass points.

The term "heading" as used herein, means the direction of the fore and aft axis, or longitudinal axis of a vehicle relative to a reference direction such as magnetic north or geographic north. As used herein, the terms "geographic north" and "true north" both mean the direction of the pole star Polaris and the term "magnetic north" means the direction of the local magnetic field of the earth. The term "direction reference axis" means an axis having a predetermined angular relation with the fore and aft axis of the vehicle and may be parallel thereto.

Figure 2:
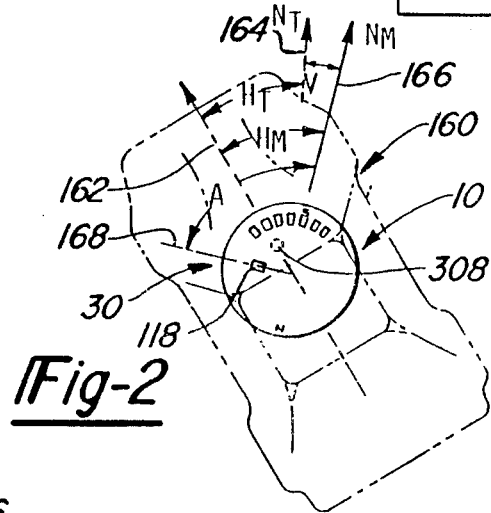
FIG. 2 is a diagrammatic representation of the compass installed in a vehicle.
Figure 3:
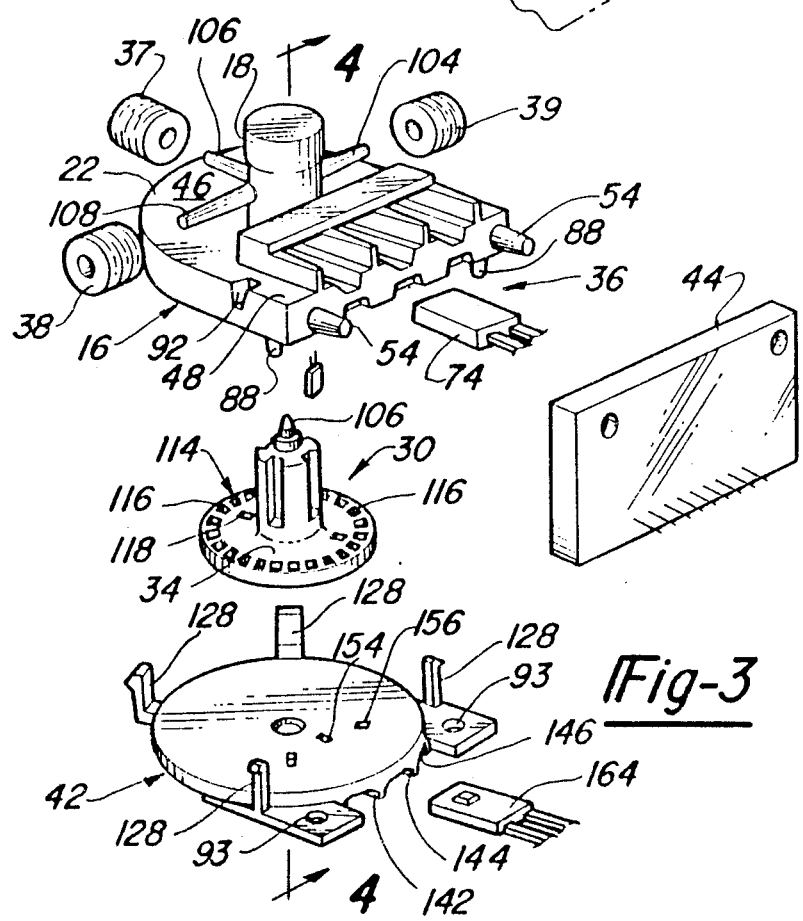
FIG. 3 is an exploded view of the compass including an optical position encoder.

Before describing the compass 10 in detail, the method of using the compass for finding the heading of a vehicle will be described with reference to FIG. 2. FIG. 2 illustrates in phantom line, an automotive vehicle 160 having a direction reference axis (coinciding with its longitudinal axis) indicated by the dashed line arrow 162. The direction reference axis 162 represents the heading of the vehicle 160 and it is desired to determine such heading with reference to the true north direction indicated by the dashed line arrow 164. The compass 10 has an orientation axis 50 (see FIGURE 7) in alignment with the direction reference axis 162 of the vehicle. With deviation compensation, the local magnetic field in the vehicle 160 coincides in direction with magnetic north. The direction of magnetic north in FIG. 2 is indicated by the solid line arrow 166. The polar axis of the rotor 30, as represented by a line between the N-S symbols is in alignment with the direction of magnetic north arrow 166. Thus, the heading of the vehicle 160 relative to magnetic north is represented by the angle $H_M$. The direction of the local magnetic field of the earth departs from the direction of true north by a variation angle which is different in different geographic locations. The variation angle between the directions of magnetic north and true north is represented by the angle V. Consequently, the heading of the vehicle 160 relative to true north is represented by the angle $H_T$ between the direction reference axis 160 and the true north direction which is indicated by the arrow 164. In order to determine the true heading $H_T$, it is necessary to first determine the magnetic heading and then algebraically add the variation angle V.

The magnetic heading $H_M$ is determined by measuring the angular displacement $H_M$ between the direction reference axis 162 and the polar axis of the rotor 30. For this purpose, the rotor is provided with a relative measurement scale, i.e. a scale which includes a plurality of discrete markers comprising apertures 116 which are angularly displaced a predetermined distance from each other. A reference line 168 is defined by a line between the axis of rotation of the rotor 30 and a reference aperture 118 on the rotor. This reference line 168 is offset from the polar axis of the rotor by an offset angle A so that the reference aperture 118 will be aligned with the reference position sensor 308 when the polar axis of the rotor is aligned with the search coil 38.

The angular displacement $H_M$ between the direction reference axis 162 and the polar axis of the rotor 30 is measured as follows. The rotor 30 is allowed to assume an arbitrary angular position relative to the direction reference axis. (Suitably, with the reference line 168 aligned with magnetic north.) Then, the rotor is turned, by energizing the search coil 38, through a sufficient angle for the reference aperture 118 to reach the reference position sensor 308. This turning motion may be in either direction, clockwise or counterclockwise. When the reference line 168 reaches or passes through alignment with the direction reference axis 162, the compass is said to be "initialized" since that alignment serves as the reference position for starting measurement of displacement relative thereto. Then, the rotor is allowed to turn, under the influence of the local magnetic field, between the position in which the reference line is in alignment with the direction reference axis to the position in which the polar axis of the rotor is aligned with the local magnetic field. This turning motion may include some overshoot of the magnetic north direction and hence the rotor will settle into the magnetic north position after both clockwise and counterclockwise motion. The turning motion of the rotor from the direction reference axis position is measured on a continuous basis so that when it finally settles in alignment with the magnetic north direction, the net angular displacement, i.e. the combined clockwise and counterclockwise motion, represents the heading angle of the vehicle relative to magnetic north.

After the compass is initialized as described above, the vehicle heading is measured continuously relative to magnetic north. The value of the variation angle V is obtained by orienting the vehicle so that the direction reference axis is aligned with the true north direction. The heading indicated by the compass is the variation angle, V. The true heading is obtained by adding algebraically the variation angle V to the magnetic heading $H_M$.

DETAILED DESCRIPTION OF THE COMPASS

The compass 10 is shown in detail in FIGS. 3, 4, 5 and 6. The compass is adapted for mounting in the orientation shown in FIG. 4, i.e. the axis 24 is aligned in the vertical direction and the cup 18 is the bottom member of the compass. The compass 10 comprises, in general, a frame including a support body 16 and a cover plate 42 with a rotor 30 therein. The support body 16 includes a cylindrical cup 18 and a base 22. The cylindrical cup has a longitudinal axis 24 and defines a cavity around the axis. The rotor 30 carries a compass magnet 28 and is rotatably mounted by pivot pins 106 and 108 which are supported, respectively, in bearing elements 102 in the cup 18 and 136 in the cover plate 42. The compass also includes an optical position encoder which comprises an encoder disk 34 which is integral with the rotor 30 and it comprises an optical transducer 36. A pair of compensation coils 37 and 39 and a search coil 38 are mounted on the outside periphery of the cup 18 in successive ninety degree intervals and in close proximity with the compass magnet 28.

The support body 16 including the base 22 and the cup 18 is a unitary molded body of polymeric material. A preferred material is a polymer sold under the name "VECTRA" by DuPont of Wilmington, Delaware. The base 22 has a semi-cylindrical portion 46 and a flat upper surface on one side of the cup 18. The base 22 is formed with a rectangular portion 48 on the other side of the cup 18. This portion is provided with a pair of mounting studs 54 which are adapted to mate with mounting holes in the electrical connector 44 for support of the compass 10. The lower surface of the base 22, as shown in FIGS. 4 and 6, is provided with a cylindrical recess 56 for accommodating the encoder disk 34. The rectangular portion 48 of the base 22 also supports the phototransistors of the optical transducer 36.

The optical transducer 36 comprises a pair of displacement sensors 304 and 306 and a reference position sensor 308. As such, the transducer includes plural sets of light emitting diodes (LEDs) and phototransistors in an arrangement which will be described subsequently. For the purpose of retaining three phototransistors, the base 22 is formed with three side-by-side compartments 62, 64 and 66. Each of these compartments has an interior wall configuration which conforms with the package configuration of a phototransistor; the wall configuration includes a channel 68 adapted to receive the lens of the phototransistor. The channel 68 of compartment 62 is provided with an aperture or slot 73 for phototransistor 72. Similarly, the channel of compartment 64 is provided with a slot 75 for phototransistor 74 and the channel of compartment 66 is provided with a slot 77 for phototransistor 76. As shown in FIGS. 5 and 6, the compartments 62, 64 and 66 receive phototransistors 72, 74 and 76, respectively. A pair of alignment pins 88 are formed on the lower surface of the base 22 and mate with alignment holes 93 on the cover 42. Base 22 is also formed with a pair of fastener openings 92 (only one shown in FIG. 3) at opposite locations on the rectangular portion 48. Also, the base 22 is formed with a pair of ears 94 extending from the semi-circular portion 46. These ears 94 are provided with fastener openings 96. The openings 92 and 96 coact with the cover 42 in a manner to be described subsequently.

The cup 18 of the body 16, as previously described, is a hollow cylinder defining a chamber 26. The chamber 26 is adapted to enclose the compass magnet 28 and the end wall thereof is provided with the bearing element 102 for the upper end of the rotor 30. The cup 18 is also provided with a set of three coil support arms 104, 106 and 108 which support the respective compensating coils 37 and 39 and the search coil 38.

The rotor 30 comprises, in general, the encoder disk 34 and the compass magnet 28 which is held by a magnet holder 110. The encoder disk 34 and the magnet holder 110 are formed as a molded unitary body of the same polymeric material as used for the support body 16. The rotor 30 is supported for rotation by the lower pivot pin 106 and the upper pivot pin 108. The compass magnet 28 is a cylindrical bipolar permanent magnet with radial polarization. The magnet holder 110 is formed with four recesses or windows adjacent the magnet 28. The recesses are disposed in orthogonal relation with each other and in a predetermined angular position relative to the reference aperture 118. The magnet 28 is magnetized after the rotor is molded by positioning the two pole pieces of a magnetizer in a selected pair of opposite recesses. This provides accurate orientation of the polar axis relative to the aperture 118.

The encoder disk 34 is provided with a single code track 114 of optical apertures 116 for providing angular displacement information. The apertures 116 are equally spaced and, in the illustrative example, there are thirty apertures in the track 114. In addition to the angular position encoder track 114, a reference position aperture 118 is provided at a predetermined angular location relative to the north/south or polar axis 120 of the compass magnet 28; in this illustrative embodiment it is centered on a line perpendicular to the north/south axis.

The cover plate 42 comprises a unitary molded cylindrical member which is adapted to fit in a snug relationship with the cylindrical recess 56 on the compass body 16. The cover plate is of the same material used for the support body 16. The cover plate 42 also is provided with the bearing element 136 in alignment with the bearing element 102 in the cup 18. A pair of flanges extend from the bottom of the cylindrical member and are provided with respective alignment holes which receive the alignment pins 88 of the support body 22 to hold the cover plate 42 in fixed angular relationship with the body 22. A set of four lock pins 128 are formed as part of the cover plate 42 and coact with the fastener openings 92 and 96 to retain the cover plate in place.

The cover plate 42 is formed with a set of three compartments 142, 144 and 146 each of which is adapted to retain an infrared light emitting diode (LED). Each compartment has a wall configuration which conforms to the package configuration of the LED. Each compartment is provided with a channel 148 which accommodates the lens of the LED. The cover plate 42 is formed with an aperture or slot 152 above the compartment 142 and in alignment with the slot 73. Similarly, the plate is formed with slots 154 and 156 which are located above the compartments 144 and 146, respectively, and are aligned with the slots 75 and 77. The LEDs 162, 164 and 166 and the phototransistors 72, 74 and 76 are electrically connected with the electronic circuit 12.

The LED 164 and the phototransistor 74 comprise a reference position sensor 308 which produces a reference signal pulse when the encoder disk 34 is in an angular position such that the reference aperture 118 is in alignment with the apertures 75 and 154. The LED 162 and the phototransistor 72 comprise a first angular displacement sensor 304 and the LED 166 and phototransistor 76 comprise a second angular displacement sensor 306.

The compass frame comprising the body 16 and cover plate 42 has an orientation axis 50 which coincides with a line extending through the axis of rotor 30 and the slot 75 of the position sensor 308. This orientation axis 50 (see arrow FIG. 7) is perpendicular to the end of the rectangular portion 48 of support body 16.

Operation of the Optical Encoder

The operation of the optical encoder will now be described with reference to FIGS. 7, 8 and 9. For purposes of explanation, it will be assumed that the encoder disk 34 is in an angular position such that the reference line 168 thereof is in alignment with the direction reference axis 162. The reference line 168 is merely a direction pointer, not a physical or structural line, and it is defined by the location of the reference aperture 118 relative to the axis of rotation 24 of the disk 34. With the encoder disk 34 in this position, the reference position sensor 308 produces a reference pulse which signifies that the encoder disk 34 is in its "home" or reference position. With the encoder disk in the reference position, the apertures 116 thereof are positioned relative to the displacement sensors 304 and 306 as indicated in FIG. 7. The code track 114 comprises a cyclically repeating pattern around the circumference of the disk 34 of alternate apertures 116 and opaque sectors of equal angular width. Thus, an aperture 116 and an adjoining opaque sector may be considered to be one cycle in the pattern. The sensors 304 and 306 have an optical beam width which is effectively one-half the angular width of each of the apertures 116 and hence, one-half the width of the opaque sector between adjacent apertures. With this relationship, the sensors 304 and 306 are spaced from each other an angular distance corresponding to an integral number of cycles plus one-fourth cycle. This spacing of the sensors results in the generation of a pulse train by sensor 304 which is phase displaced from the pulse train generated by the sensor 306. More particularly, the pulse train from sensor 304 will lag behind the pulse train from sensor 306 when the encoder disk 34 is rotated in the clockwise direction and it will lead the pulse train from sensor 306 when the disk is rotated in the counterclockwise direction. The phase difference is one quarter cycle. This phase displacement is indicative of the direction of rotation of the encoder disk. FIG. 8 is a graphical representation of the pulse signals generated by the sensors 308, 304 and 306. In this graphical representation, the abscissa axis represents angular displacement of the encoder disk 34 and the ordinate axis represents relative signal amplitude from the respective sensors. For explanatory purposes the pulses of the pulse trains, as shown in FIG. 8, are idealized as rectangular pulses. The pulse trains 354 and 356 are each alternately high for one-half cycle and low for one-half cycle. The logical pulses are each one quarter cycle wide. The reference pulse 352 is at a logical low value or "0" when the encoder disk is in the reference position shown. The pulse train 354 produced by the displacement sensor 304 is at a logical high or "1" and the pulse train produced by the pulse train 356 produced by the sensor 306 is also at a logical high or "1" in the reference position of the encoder disk 34. When the encoder disk is rotated from the reference position in a clockwise direction, the displacement sensor 304 will produce logic signals, as represented by the pulse train 354, in the sequence of 1-1-1-0-0 as indicated by that notation on FIG. 8. When it is rotated in the counterclockwise direction, the logic signal will have the sequence of 1-0-0-1. At the same time, the sensor 306 will produce a logic signal having the sequence of 1-0-0-1 for clockwise rotation and the sequence of 1-1-0-0 for the counterclockwise direction. The displacement angle from zero degrees (or three hundred sixty degrees) is indicated on the lowermost abscissa axis of FIG. 8. The logic signals in the pulse trains 354 and 356 which are simultaneously by the sensors 304 and 306 are combined as a pair, as shown in the table of FIGURE 9, for each angular increment of displacement.

FIG. 9 shows the two bit logic signals produced by displacement sensors 304 and 306 as a function of angular position or displacement. For purposes of explanation, it will be assumed that the encoder disk 34 has been rotated by the search coil 38 to the reference position, as shown in FIG. 7. In this position, the logic signal is 1—1. When the search coil is no longer energized, the encoder disk will be free to rotate under the influence of the local magnetic field so that the north seeking pole thereof will become aligned with the magnetic north direction. With reference to FIG. 9, it is noted that the displacement count with the encoder disk in the reference position is taken as a value of one hundred twenty or a value of zero depending upon whether the rotation away from the reference position is in the clockwise or counterclockwise direction. It is further noted that with the encoder disk in the reference position, the angular position in degrees, as indicated in FIG. 9, is in the range of two hundred sixty-eight and one-half degrees to two hundred seventy-one and one-half degrees. This corresponds nominally with the direction of two hundred seventy degrees, it being further noted that this would be the magnetic heading indicated by the compass if the encoder disk remained in the reference position. This value of magnetic heading is obtained, as described above, by subtracting the offset angle A of ninety degrees from the measured angular value of three hundred sixty degrees (corresponding to a count of one hundred twenty). As indicated in FIG. 9, the logic signal will remain at 1—1 over an angular range of three degrees spanning from two hundred sixty-eight and one-half degrees to two hundred seventy-one and one-half degrees. If the encoder disk is rotated clockwise past two hundred seventy-one and one-half degrees, the logic signal will change to 1—0 and remain at that value until it reaches an angular displacement of two hundred seventy-four and one-half degrees. When the displacement angle reaches that value, the logic signal will change to 0—0 and remain at that value until angular displacement is two hundred seventy-seven and one-half degrees. At that value the signal will change to 0—0 and remains at that value until the angular displacement is two hundred eighty and one-half degrees. Then, the sequence of logic signal values is repeated. For counterclockwise motion, the sequence of values of the two bit logic signals is 1—1, 0—1, 0—0 and 1—0 as shown in the table of FIG. 9 for corresponding angular increments of displacement. This sequence of logic signal values is repeated for continued counterclockwise rotation. With the encoder disk 34 in any angular position, its direction of rotation from that position can be determined by comparing the two bit logic signal at its current value with the previous logic signal value. For example, with the encoder disk in the reference position, the logic signal is 1—1. If the next logic signal is 1—0 the rotation is clockwise and if it is 0—1 the rotation is counterclockwise. In the illustrative embodiment, there are thirty apertures 116 in the code track. This, as can be seen from the table of FIG. 9, provides for an angular resolution of three degrees. Consequently, the number of discrete angular positions which can be determined for the encoder disk 34 is one hundred twenty. Therefore, the angular displacement from the reference position may be designated by a number ranging from zero to one hundred nineteen with a different number for each three degree increment. The reference position is designated either as a count of zero or the equivalent count of one hundred twenty. The angular position measured from the reference position may be designated as the cumulative count of the changes in the two bit logic signal values, taking into account the direction of rotation as being either clockwise or counterclockwise. FIG. 9 shows in the clockwise displacement count column the cumulative count for each angular position for clockwise direction and the counterclockwise displacement count column shows the cumulative count for each position for counterclockwise rotation. Therefore by starting the count at zero or one hundred twenty and incrementing it by one for each change of logic signal value in the clockwise direction and decrementing it by one for each change in the counterclockwise direction, the net or cumulative count will represent the unique angular displacement or position of the encoder disk 34 relative to the reference position.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. A vehicle compass with which heading is determined by measuring compass rotor displacement from a reference position to a position in alignment with the local magnetic field after the rotor is turned by a search coil to the reference position, said compass comprising:
   a support body comprising a cylindrical cup and a support member defining a recess at the open end of said cup,
   a compass rotor including a compass magnet, an encoder disk and pivot pins defining a rotation axis of said rotor, said rotor being disposed with the magnet in the cup and with the pivot pins supported by the bottom of the cup and the support member,
   said support member comprising a base plate and an axially spaced cover plate with said encoder disk therebetween, said base plate defining a vehicle orientation axis,
   said encoder disk having a reference aperture therein,
   each of said plates having a first optical aperture therein at a first predetermined angular position relative to said orientation axis and at the same radial position as said reference aperture,
   a transducer comprising a reference position sensor having a first optical transmitter and first optical receiver with an optical axis therebetween in alignment with the first optical apertures in said plates,
   a first retaining means on one of said plates and a second retaining means on the other of said plates for holding said first transmitter and first receiver, respectively, in said alignment with the first optical apertures,
   a support arm for a search coil on said cup opposite said magnet in a predetermined angular location relative to said orientation axis and a search coil on said support arm,
   said base plate, cup and support arm being a unitary molded body of polymeric material whereby the optical axis of said sensor and the location of said search coil have predetermined and precisely reproducible angular locations relative to said orientation axis.

2. The invention as defined in claim 1 wherein:
   said encoder disk has a plurality of apertures therein disposed in a single circumferential track,
   each of said plates has a second optical aperture therein at a second predetermined angular position relative to said orientation axis and at the same radial position as said track,
   said transducer comprising at least one displacement sensor having a sensor optical transmitter and second optical receiver with an optical axis therebetween in alignment with said second optical apertures in said plates,
   and third retaining means on one of said plates and a fourth retaining means on the other of said plates for holding said second transmitter and second receiver, respectively, in said alignment with the second optical apertures.

3. The invention as defined in claim 2 wherein:
   each of said plates has a third optical aperture therein at a third predetermined angular reference position relative to said orientation axis and at the same radial position as said track,
   said transducer comprising a second displacement sensor having a third optical transmitter and third optical receiver with an optical axis therebetween in alignment with said third optical apertures in said plates,
   and fifth retaining means on one of said plates and a sixth retaining means on the other of said plates for holding said third transmitter and third receiver, respectively, in said alignment with the third optical apertures.

4. The invention as defined in claim 1 wherein:
   said rotor includes a magnet holder formed of molded polymeric material,
   said compass magnet and said pivot pins are embedded in said magnet holder,
   and said encoder disk is unitary with said magnet holder and axially displaced from said magnet.

5. The invention as defined in claim 4 wherein:
   said magnet holder defines a pair of diametrically opposite, radially opening, recesses having a predetermined angular location relative to a reference line extending radially through said reference aperture and said rotation axis whereby said compass magnet may be magnetized with a polar axis having a predetermined angular position relative to said reference line by placing elements of a magnetizer in said recesses in close proximity with the magnet after it is embedded in said holder.

6. The invention as defined in claim 1 including:

a pair of compensation coil support arms unitary with said cup in an axial location opposite said magnet and in orthogonal relationship with each other.

7. The invention as defined in claims 1, 2 or 3 wherein:

each of said optical transmitters is a LED and each of said optical receivers is a photodetector, and each of said retaining means is a compartment disposed radially outwardly of said cup on the axial face of said cover plate or said base plate, as the case may be.

8. The invention as defined in claim 7 wherein said cover plate is a unitary body, and including:

means for holding said cover plate in fixed angular and axial position relative to said base plate.

9. A vehicle compass with which heading angle is determined by measuring compass rotor displacement from a reference position to a position in alignment with the local magnetic field, said compass comprising:

a support body comprising a cylindrical cup and a support member defining a recess at the open end of the cup, a compass rotor comprising an encoder disk, a magnet holder formed of molded polymeric material, a compass magnet embedded in said magnet holder and a pair of pivot pins defining the rotation axis of the rotor and embedded in said magnet holder, said rotor being disposed with the magnet in the cup and the encoder disk in said recess with the pivot pins supported, respectively, by the bottom of the cup and the support member, said encoder disk being unitary with said magnet holder and axially displaced from said magnet, said encoder disk having a reference aperture therein defining a reference line extending radially through said reference aperture and said rotation axis, said compass magnet being magnetized with a polar axis having a predetermined angular position relative to said reference line.

10. The invention as defined in claim 9 wherein:

said magnet holder defines a pair of diametrically opposite, radially opening, recesses having a predetermined angular location relative to said reference line with said compass magnet may be magnetized with said polar axis having said predetermined angular position by placing magnets of a magnetizer in said recesses in close proximity with the magnet after it is embedded in said holder.

* * * * *